United States Patent [19]

Lockwood

[11] 3,968,001

[45] July 6, 1976

[54] AUTOMATIC TAPE DISPENSER

[76] Inventor: William G. Lockwood, 4800 Clair Del, Long Beach, Calif. 90808

[22] Filed: Sept. 26, 1974

[21] Appl. No.: 509,554

[52] U.S. Cl. ................................ 156/523; 156/577; 156/579

[51] Int. Cl.[2] ........................ B32B 31/00; B44C 7/06

[58] Field of Search ........... 156/523, 527, 574, 579, 156/575, 526, 524, 577

[56] References Cited

UNITED STATES PATENTS

| | | | |
|---|---|---|---|
| 971,133 | 9/1910 | Maynes | 156/526 |
| 2,487,351 | 11/1949 | Marsh | 156/526 |
| 2,815,142 | 12/1957 | Ames | 156/526 |
| 3,116,195 | 12/1963 | Lathrop et al. | 156/575 |
| 3,260,638 | 7/1966 | Hoveland | 156/575 |
| 3,297,510 | 1/1967 | DuBroff | 156/526 |
| 3,625,798 | 12/1971 | Ihli | 156/523 |

*Primary Examiner*—Douglas J. Drummond
*Assistant Examiner*—M. G. Wityshyn
*Attorney, Agent, or Firm*—Gausewitz, Carr & Rothenberg

[57] ABSTRACT

An automatic tape dispenser for dispensing and applying dry-wall tape comprises a dispenser body mounting a roll of tape and carrying a pair of feed rollers for withdrawing tape from the roll and advancing the withdrawn tape to pass loosely and freely over pressure wheels at a forward end of the dispensing body. The feed rollers are spring biased into rolling contact, tape being both withdrawn and advanced by entrainment therebetween. The pressure wheels and one of the feed rollers are formed with gear teeth around outer peripheries thereof and are constrained to rotate in unison, being directly interconnected by an intermediate gear. Rotation of the pressure wheels while tape is being applied causes withdrawing and advancing of other portions of tape from the roll independently of tension in the applied tape, the applied tape being isolated from forces required to withdraw and advance such other portions. A tape cutter blade is disposed in guides on a handle mount and is operable by thumb pressure. A tape guide supports the tape during the cutting operation to provide a shearing action. A newly cut end of tape is advanced to the pressure wheels as the previous end of tape is applied without need for manually rethreading the tape.

5 Claims, 6 Drawing Figures

AUTOMATIC TAPE DISPENSER

BACKGROUND OF THE INVENTION

1. Field of the Invention

This invention relates to tape dispensers and applicators and more particularly to dispensers and applicators for paper tape used to seal dry-wall joints.

2. Description of the Prior Art

Interior walls of buildings are commonly finished with sheets of wall board, commonly known as sheet rock, plaster board or gypsum board. Side edges of such sheets are beveled on the outer surface so that an elongate concave region is formed along edges of abutting sheets. Joints in the concave region are first covered with a layer of mastic compound. A strip of special dry-wall joint tape is applied to and embedded in the compound while it is still soft and a finishing coat of compound is applied thereover and trowelled smoothly to form a hidden joint. The dry-wall tape reinforces the compound and is meant to prevent cracking thereof.

Hand finishing of joints in this manner is time consuming and it is desirable that at least portions of the operation be mechanized. The portion which best lends itself to mechanization is application of the dry-wall tape, since the tape need only be applied to an existing layer of mastic compound and pressed thereinto so that it adheres to it. It is a more difficult operation to smoothly and evenly apply layers of compound.

However, mechanical application of the tape presents problems not readily overcome. The dry-wall tape is non-adhesive and relies upon the stickiness of the mastic compound for adherence, therefore, the tape must be applied to the compound before the compound cures, while it is still soft. This dictates that the applied tape not be required to supply the force necessary to withdraw the tape from the tape supply, otherwise applied portions of the tape may be dragged along the compound or pulled loose from it. Also the tape, being comprised of many layers of paper, is tough and difficult to cut, requiring substantial cutting pressure.

Although there is available one known machine (the Ames Automatic) for applying dry-wall tape in open area, such machine is impractical for relatively small jobs, and because it is large and requires two hands to operate, cannot be used in areas where an operator has only one hand free or in restricted areas where there is insufficient room to manipulate a two handed machine. Such restricted spaces are common and may, for example, be found in small closet areas or around heating and cooling ducts.

A relatively small machine capable of one handed operation is required for such restricted spaces, and such machine must be capable of applying tape along a section of joint, cutting the tape off at the end of that section and advancing a new end of tape for applying to a next section of joint. This must all be done with one hand and must be done faster than manual application of the tape can be accomplished. Also, such machine must be light in weight and capable of operation without undue fatigue of the operator's hand. It should also be capable of either left or right handed operation. Furthermore, the machine should be relatively inexpensive, but be capable of withstanding constant use with the attendant abuses.

Heretofore, to the applicant's knowledge, no such machine having these characteristics as just described has been available for applying dry-wall tape.

SUMMARY OF THE INVENTION

In carrying out principles of the invention according to a preferred embodiment, an automatic tape dispenser comprises a dispensing body, a tape supply mounted in said body, and pressure roller means rotatably mounted in the dispensing body for pressing against a tape receiving surface with a portion of tape from the tape supply extending partially around the pressure roller means and between such pressure roller means and the tape receiving surface. The pressure roller means is caused to rotate by translation of the dispensing body with the pressure roller means pressed against the tape and the tape receiving surface. Cutting means, adapted for cutting tape from the roll of tape, are provided. Tape withdrawing and advancing means are rotatably mounted in the dispensing body. The tape withdrawing and advancing means are caused to rotate in response to rotation of the pressure roller means to cause initially, and each time tape is cut by the cutter means, a new end of tape to be advanced to the pressure roller means and pass loosely and freely thereover in readiness for applying. The rotation of the tape withdrawing and advancing means causes tape to be withdrawn from the tape supply independently of tension in portions of tape being advanced to the pressure roller means, portions of tape already applied thereby being isolated from forces employed to withdraw tape from the tape supply, whereby there is no tendency to pull already applied tape loose from the tape receiving surface.

DESCRIPTION OF THE PREFERRED EMBODIMENT

Figure 1:
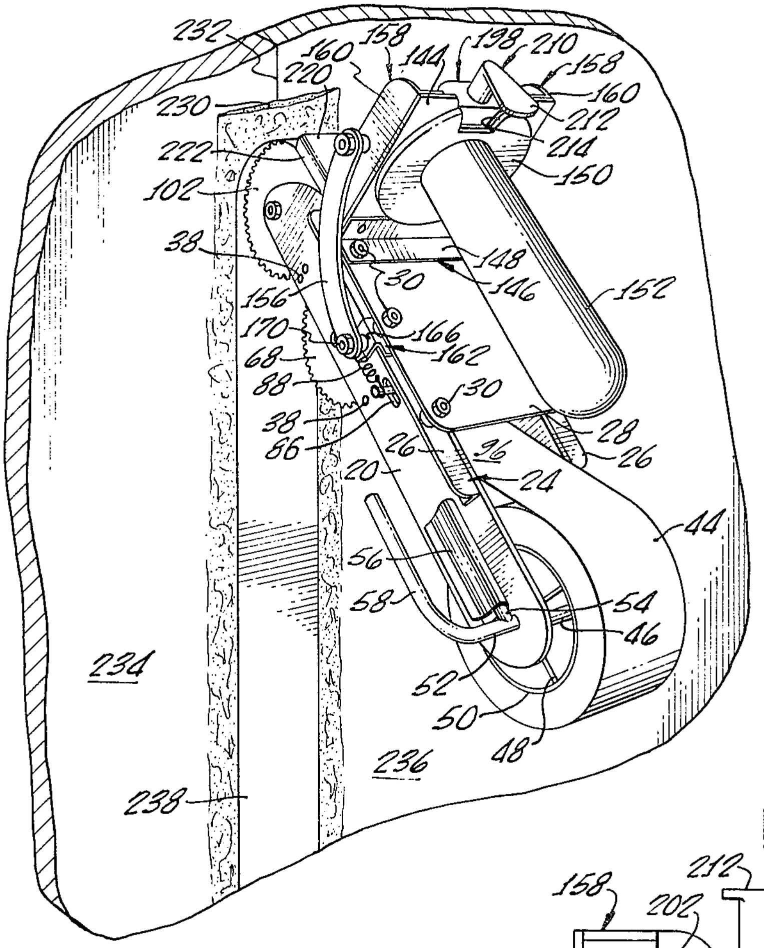
FIG. 1 is a perspective view showing use of dry-wall tape dispensing and applying apparatus embodying principles of this invention.
Figure 2:
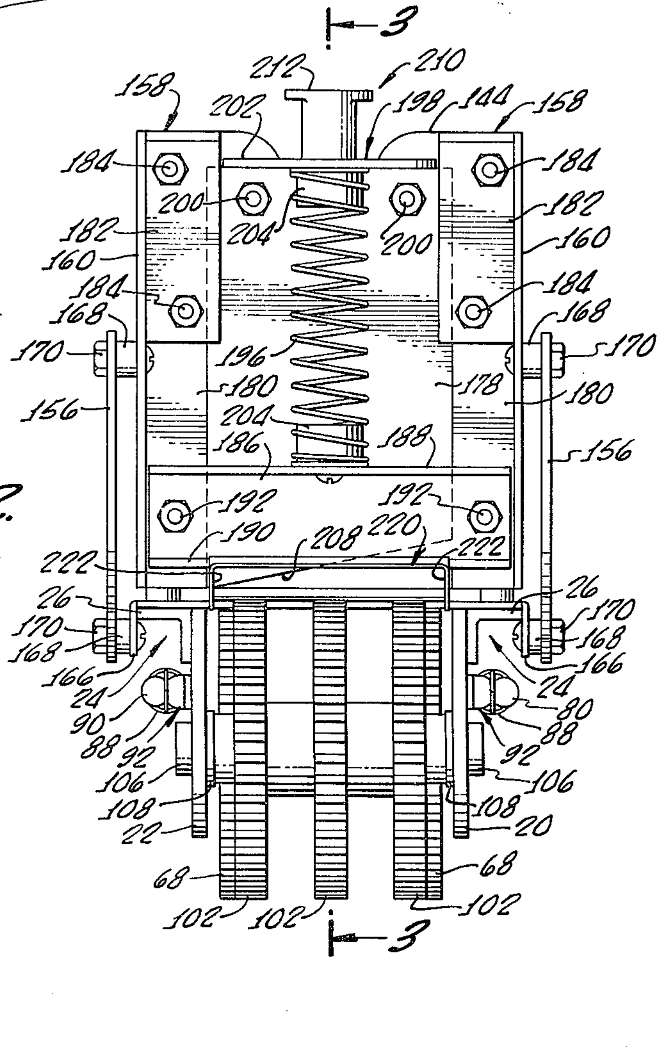
FIG. 2 is a front elevational view of the apparatus of FIG. 1.
Figure 3:
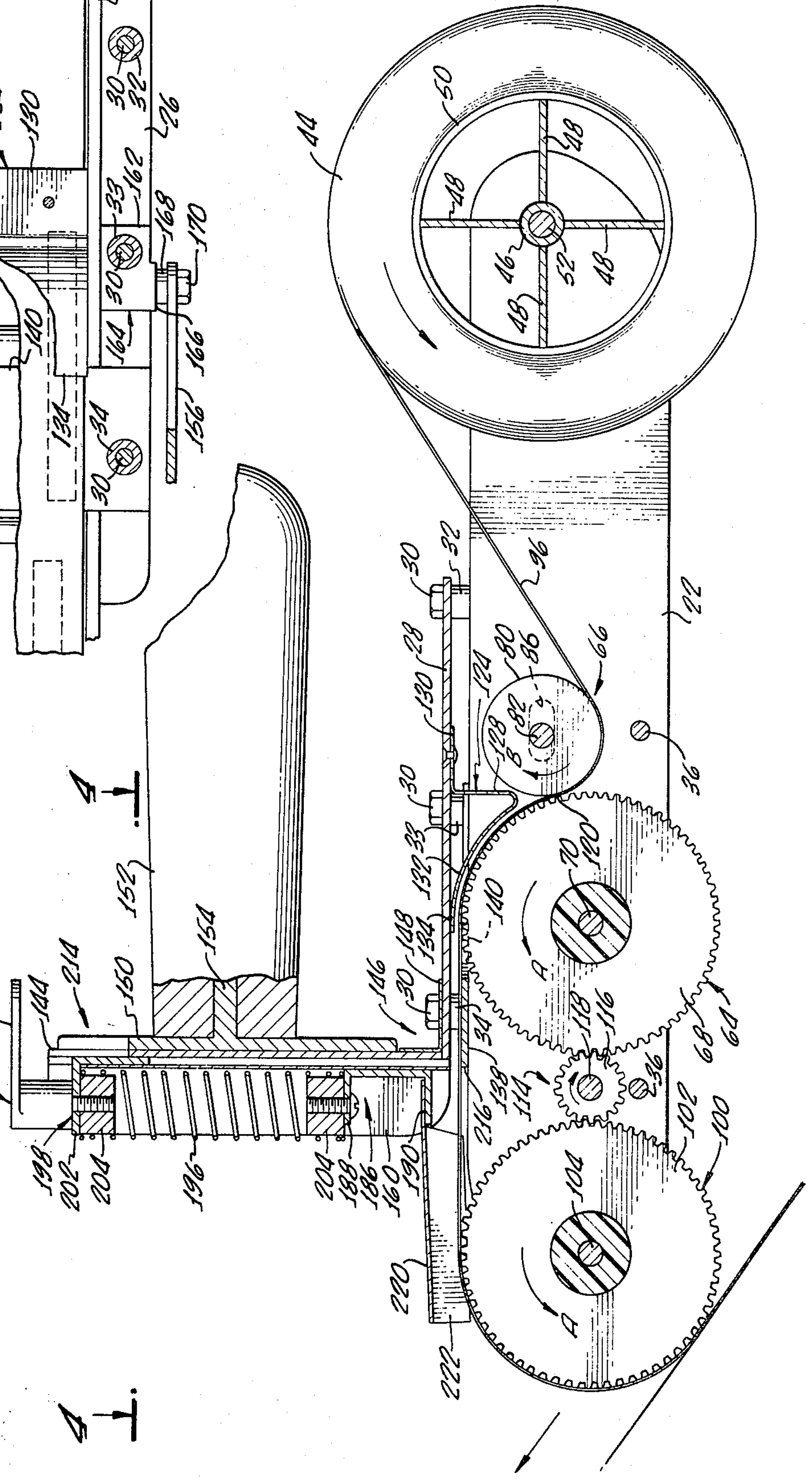
FIG. 3 is a vertical sectional view along line 3—3 of FIG. 2, showing construction of the apparatus and routing of the dry-wall tape therethrough.
Figure 4:
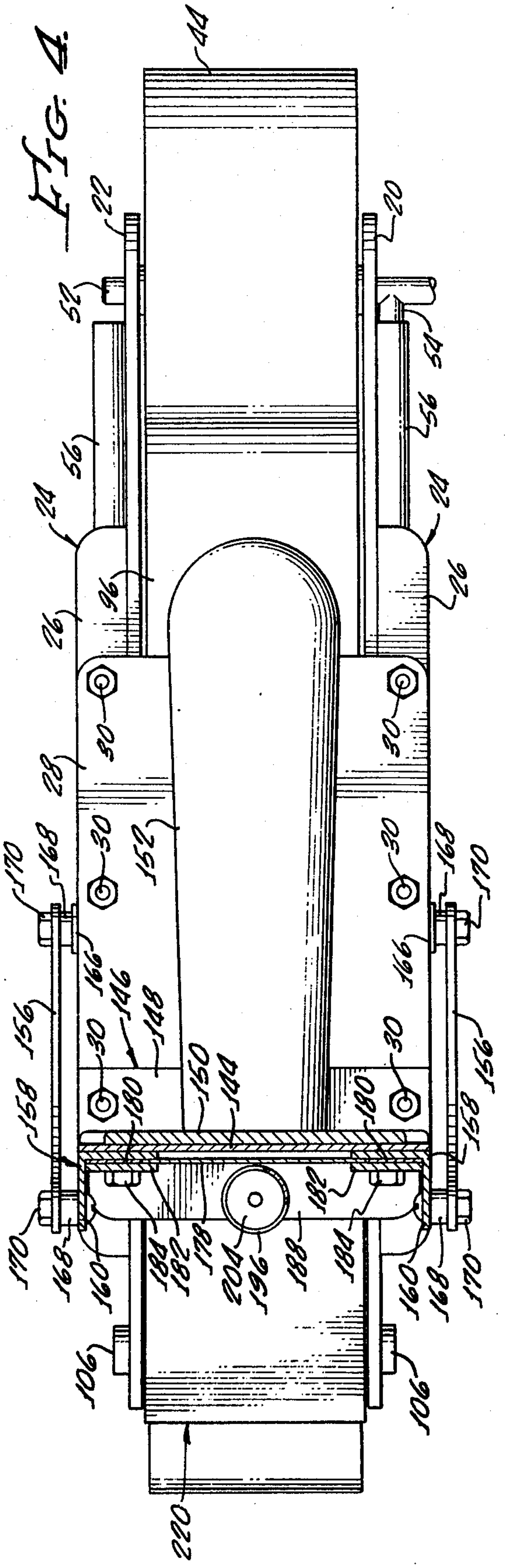
FIG. 4 is a view along line 4—4 of FIG. 3, showing construction of the apparatus.

A dispensing body or frame, as best seen in FIGS. 2, 3 and 4, is formed of two laterally spaced, elongate side plates having generally arcuate end regions: A left (as seen in FIG. 1) side plate 20 and a right side plate 22. A narrow vertical leg of an angle 24 is attached to the outer side of each side plate 20, 22 along upper edges thereof in forward central regions, the angles 24 being about half as long as the side plates. Narrow legs 26 of the angles 24 project outwardly from the upper edges of the side plates 20, 22.

The side plates 20, 22 are maintained in laterally spaced relationship by a transverse top plate 28 which is attached along side edges to the upper surfaces of the legs 26 by bolts 30 (six bolts being shown). The top plate 28, which is shorter than the angles 24, is slightly separated from the legs 26 by two short, tubular rearward spacers 32, two shorter intermediate spacers 33 and two shorter forward spacers 34 (as more fully described below). The bolts 30 pass through the legs 26, the spacers 32, 33 or 34 and the top plate 28. To maintain lateral spacing of the lower regions of the side plates 20, 22, two spacer rods or tubes 36 are installed between lower edges of the side plates, one below about the longitudinal center of the top plate 28 and the other somewhat forwardly of the top plate, such rods being maintained in place by countersunk screws 38, which extend through the side plates into threaded ends of the rods (FIG. 1).

The frame formed in this manner is lightweight, strong and rigid, and is easy and economical to produce.

At the rearward end of the frame, a tape supply which is a roll of tape 44, is rotatably mounted between the side plates 20, 22. A tubular hub 46 has a plurality of radial vanes 48, which tightly fit into a tubular spool 50 upon which the roll of tape 44 is supplied. A mounting pin 52 passes through apertures in the side plates 20, 22 and the hub 46 to retain the roll of tape 44 between the side plates.

An elongate locking pin 54 is connected (as by welding) at right angles to the mounting pin 52 so as to be adjacent to one of the side plates 20, 22 when the mounting pin is fully installed. The locking pin 54 also acts as a stop when the mounting pin is inserted. An elongate spring locking clip 56 is attached to each side plate 20, 22 adjacent to, and forwardly of, the apertures for the mounting pin 52. The locking clips 56 have an inverted U-cross-section, with lower regions closer together than upper regions thereof. The bottom edges of the clips 56 are flared or bent slightly outwardly so that the locking pin 54 can easily be received into the locking clip via the lower openings therein.

Outwardly of the locking pin 54, the end of the mounting pin 52 is bent to be parallel with the locking pin, thus forming an elongate hook portion 58 by which the apparatus may be hung when not in use, and which also forms a convenient handle when mounting the roll of tape 44, as described below.

Figure 5:
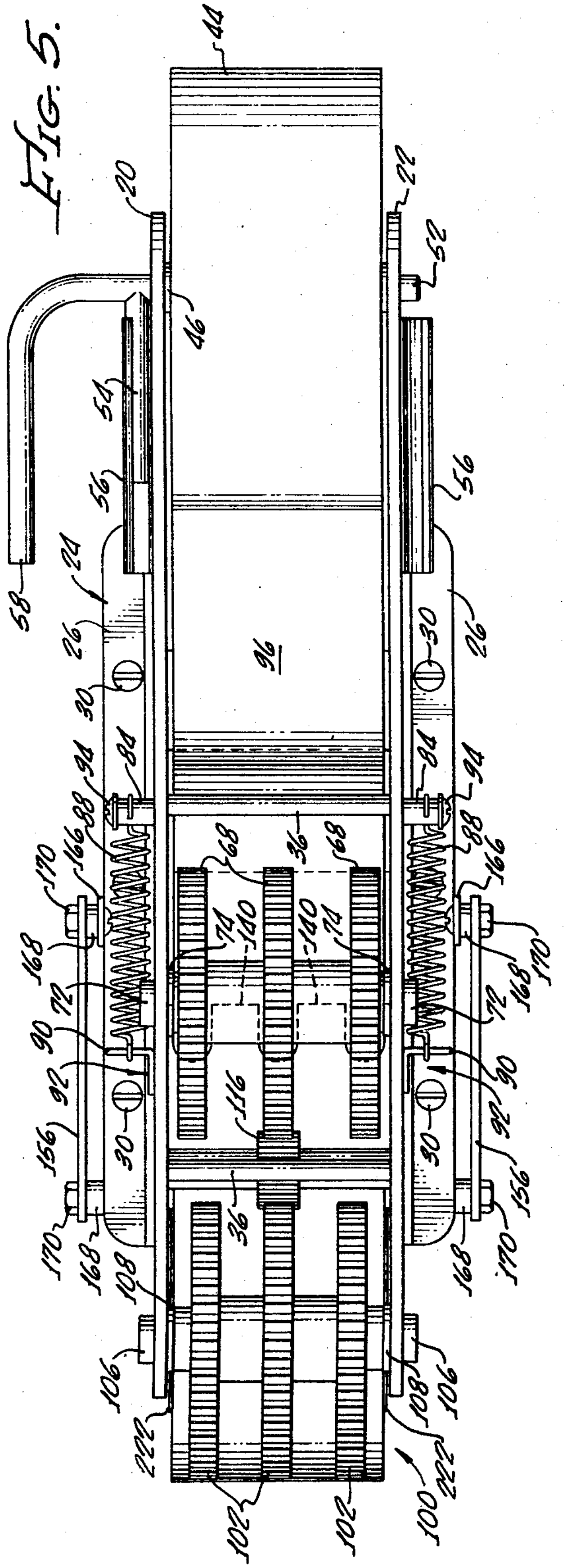
FIG. 5 is a bottom view of the apparatus.

A tape withdrawing and advancing means, comprising a first feed roller 64 and a second feed roller 66 is mounted between the side plates 20, 22 about two thirds of the length of the side plates forwardly of the roll of tape 44. Preferably, and as best seen in FIGS. 3 and 5, the first roller 64 comprises a plurality of first feed wheels 68 (three being shown) fixed in spaced relationship by conventional means to a first shaft 70, ends of which are journalled for rotation in bushings 72 mounted in the side plates 20, 22. Inwardly positioned flanges 74 of the bushings 72 retain the bushings in the side plates 20, 22. Also preferably, the first wheels 68 are formed having gear teeth around the outer peripheries thereof to provide traction and for driving, as described below. Lower portions of the first wheels 68 project downwardly below the lower edges of the side plates 20, 22.

The second roller 66, preferably comprises a plurality of second feed wheels 80 (three being shown) rotatably mounted in fixed spaced relationship on a second shaft 82. The second feed wheels 80 are smaller than the first feed wheels 68 and have smooth outer peripheries. The spacings of both such sets of feed wheels 80 and 68 on their respective shafts 70, 82 are the same.

Ends 84 of the second shaft 82 project outwardly through elongate slots 86 formed in the side plates 20, 22 above and rearwardly of the first shaft 70. The slots 86 are parallel to the longitudinal axes of the side plates 20, 22 and are several times longer than the diameter of the second shaft 82.

Two tension springs or biasing elements, one on each side, are connected between the second shaft ends 84 and outwardly projecting legs 90 of short angles 92, which are attached to the side plates 20, 22 forwardly of the first shaft 70, are in line with the slots 86. Large headed screws 94, axially threaded into the ends 84 prevent the rearward ends of the springs 88 from slipping off the shaft (FIG. 5).

The springs 88 urge the second shaft 82 forwardly in the slots 86, thereby pressing the second feed wheels 80 toward rolling contact with the first feed wheels 68 so that tape 96 from the roll of tape 44 may be entrained therebetween and be thereby withdrawn from the roll of tape and be advanced forwardly by rotation thereof, as more fully described below.

At the forward end of the frame, a pressure roller 100 is mounted between the side plates 20, 22. The pressure roller 100 preferably comprises a plurality of pressure wheels 102 (three being shown) fixed in spaced relationship on a third shaft 104, ends of which are journalled for rotation in bushings 106 in the side plates 20, 22. Inwardly positioned flanges 108 of the bushings 106 retain the bushings in the side plates 20, 22. The pressure wheels 102 are formed with gear teeth around outer peripheries thereof and, for purposes of economy, are preferably identical to the first feed wheels 68. Portions of the pressure wheels 102 project forwardly of and downwardly from the forward ends of the side plates 20, 22, so as to be in position for pressing tape from the roll of tape 44 to a tape receiving surface, again as more fully described below.

The outermost of the pressure wheels 102 are spaced on the third shaft 104 so that outer surfaces thereof are closer together than the width of the tape to be applied in order that, during application, edges of the tape will not slip inwardly of such wheels and thus not be properly applied. This is in contrast to the outermost of the first feed wheels 68 which are spaced to have outer surfaces thereof a distance apart about equal to the width of the tape 96 from the roll of tape 44.

Intermediate the pressure roller 100 and the first feed roller 64, an interconnecting gear means 114 is mounted between the side plates 20, 22. The gear means 114 comprises a small gear 116 rotatably mounted on a fourth shaft 118, ends of which are mounted in apertures in the side plates 20, 22. The axes of the first, third and fourth shafts 70, 104 and 118 are coplanar, such axes, as well as that of the second shaft 82 and the mounting pin 52, being mutually parallel and being perpendicular to the side plates 20, 22.

Teeth of the gear 116 intermesh with teeth of the centermost of the pressure wheels 102 and the first feed wheels 68, which are positioned to be coplanar, thereby causing the first feed wheels to rotate in response to rotation of the pressure wheels. Stated otherwise, the pressure wheels 102 and the first wheels 68 always rotate in unison because they are directly interconnected by the gear 116.

Guide means are provided intermediate the tape withdrawing and advancing means and the pressure roller 100 to guide cut ends of tape from the former to the latter and to prevent such cut ends from wrapping around the first feed roller 64. A first guide element 124 is installed between the side plates in the region above a rolling contact point 120 of the first and second wheels 68 and 80 (FIG. 3). The element 124 is formed from a thin sheet to have a portion 128 depending from the underside of the top plate 28 to which it is attached by a rearwardly directed flange or leg 130. The portion 128 projects downwardly nearly to the contact point 120 and bends sharply upwardly and forwardly to form an arcuate portion 132 which is positioned closely adjacent to upper rearward portions of the wheels 68. The forward edge 134 of the arcuate portion 132 is adjacent to the underside of the top plate 28 and is above the first shaft 70.

Figure 6:
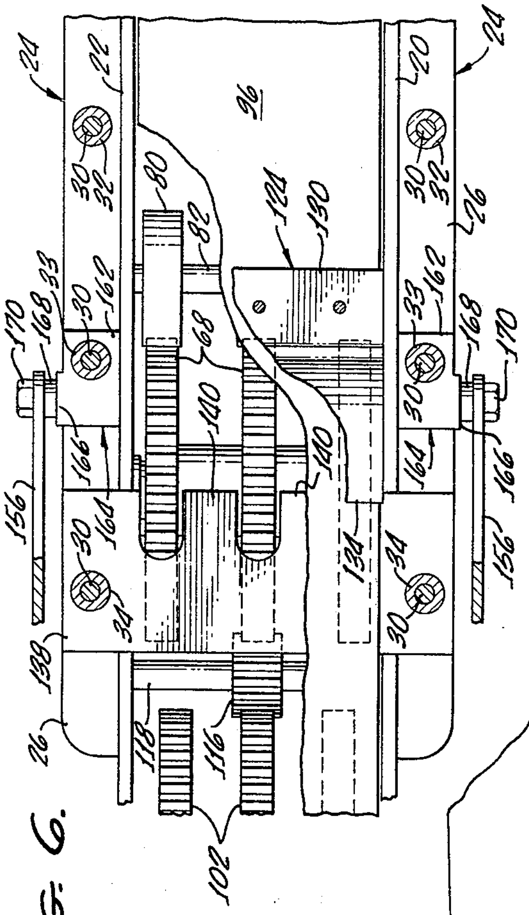
FIG. 6 is a partial sectional view of FIG. 3, showing the tape guide means.

A second guide element, which is a flat plate 138, is positioned generally forwardly of and slightly below the first guide element 124, outer portions thereof being attached to upper surfaces of the legs 26 of the angles 24 by the forwardmost of the bolts 30, the spacers 34 spacing the upper surface of the second guide element below the top plate 28. The thickness of the second guide element 138 and the length of the spacers 34 equals the length of the rearwardmost spacers 32. As best seen in FIG. 6, fingers 140 of the second guide element 138 project rearwardly between the first wheels 68 at the uppermost edges thereof over the shaft 70. The rearward edges of the fingers 140 underlap the forward edge 134 of the first guide element 124 by a small amount to enable positive tape guiding.

Handle means are provided so that an operator may easily hold and operate the apparatus. A plate 144, having a transverse angle 146 attached thereto at a lower edge, is attached to the frame by means of the forwardmost of the bolts 30 which are passed through a rearwardly projecting leg 148 of such angle (FIG. 3). The plate 144 extends upwardly, at right angles to the top plate 28 and is positioned along the forward edge thereof. The longitudinal positioning of the plate 144 is such that, as described more fully below, pressure may be applied generally through the axis of the third shaft 104 to the tape being applied to a tape receiving surface. A generally circular handle mounting plate 150 is attached to the plate 144 above the angle 146. An elongate, rearwardly projecting handle 152 is threaded onto a threaded shaft 154 rearwardly projecting from the center of the plate 150.

Two arcuate brace elements 156 are connected, one on each side, between the handle mount and the frame to brace the handle against the tape applying forces. A brace mounting angle 158 (FIG. 4) is attached to the forward face of the plate 144 along each side edge thereof, a leg 160 of each angle projecting forwardly from such side edges. A leg 162 of a short section of a second brace mouting angle 164 is attached to the upper surface of each of the legs 26 of the angles 24 by the centermost of the bolts 30 (FIG. 6), the upper legs 162 being spaced from the underside of the top plate by the centermost spacers 33, the length thereof plus the thickness of the legs 162 being equal to the length of the rearmost spacers 32. Forward portions of the angles 164 have downwardly projecting legs 166 which are just outwardly of the outer edges of the legs 26 of the angles 24. The brace elements 156 are connected between the general midpoints of the legs 166 of the angles 164 and the legs 160 of the angles 158, the brace elements being spaced outwardly therefrom by short spacers 168 and which are fastened thereto by bolts 170. The brace elements 156 curve downwardly and forwardly to provide clearance for an operator's hand on the handle 152.

Cutter means for cutting tape from the roll of tape 44 are disposed intermediate the first feed roller 64 and the pressure roller 100. A planar cutter blade 178 (FIGS. 2 and 4) is slidably mounted in a guideway formed on the forward side of the angles 158 attached to the forward face of the plate 144, which is also a cutter blade support. The guideway includes elongate narrow spacer plates 180 positioned along the forward sides of the angles 158, the thickness of such plates being somewhat greater than the thickness of the cutter blade 178, and the spacing between inner edges of the spacer plates being somewhat greater than the width of the cutter blade to permit a snug sliding fit of the blade. Upper portions of the spacer plates 180 have rectangular cover plates 182 forwardly attached thereto by bolts 184 which pass through the cover plates, the spacer plates, the angles 158 and the plate 144. Outer edges of the cover plates 182 are flush with outer edges of the spacer plates 180 and inner edges of the cover plates overlap inner edges of the spacer plates 180 to retain the blade 178 in the guideway. A transverse channel 186, having forwardly directed upper and lower legs 188 and 190 respectively, is connected across lower regions of the spacer plates 180 a short distance from the lower edge of the angles 158 and the plate 144 to form a forward guide plate at the lower end of the blade guide means. Bolts 192 attach outer ends of the channels 186 and the lower ends of the spacer plates 180 to the angle 158 and the plate 144. The cutter blade is installed downwardly into the guideway formed on the rearward side by the angles 158, on the forward side by the inwardly projecting edges of the cover plates 182 and the channel 186, and on the edges by the edges of the spacer plates 180.

A compression spring 196 (FIG. 2) is employed to bias the cutter blade 178 to a raised or initial position. A short transverse angle 198 (FIGS. 2 and 3) is attached to the upper central edge of the blade 178, being attached from the rearward side of the blade by bolts 200. A spring mounting leg 202 of the angle 198 projects forwardly over the top of the blade 178 and is parallel to the upper leg 188 of the channel 186. Ends of the spring are fit about short cylindrical plugs 204 which are attached to the lower surface of the leg 202 and the upper surface of the leg 188 in opposing relationship, and in central regions thereof. The spring 196, normally uncompressed and untensioned, maintains the blade 178 in such position that a lower cutting edge 208 is located just above the path of tape travel. A thumb operated actuator 210, having a rearwardly projecting flange 212 at the top thereof, is attached to the upper surface of the leg 202 directly above the plug 204. The flange 212 projects rearwardly over upper regions of the plates 144 and 150, both of which have a notch 214 formed in such upper regions to provide clearance for the flange when the actuator 210 is depressed (FIGS. 2 and 3). The bottom of the notch 214 acts as a stop to limit cutter blade travel.

The cutting edge 208 of the blade 178 is angled upwardly from one side edge to the other. A forward edge 216 of the guide element 138 terminates immediately rearwardly of the path of travel of the blade 178 (FIG. 3), the element serving not only as a tape guide but as a tape support during the cutting operation and thus enabling a tape shearing action in addition to the slicing action provided by the angled blade edge 208.

In the manner described, a direct action cutter is provided to which considerably thumb pressure may be applied by an operator, such pressure being generally in line with the cutting edge. The cutter blade 178 may easily be removed from its guideway for sharpening by disengaging one end of the spring 206 from one of the plugs 204 and sliding the cutter up out of the guideways.

A third tape guide element 220 (FIG. 3), in the shape of an elongate channel opening downwardly, is attached to the upper surface of the lower leg 190 of the channel 186. The element 220 projects forwardly over the wheels 102, teminating forwardly of the third shaft 104. Depending sides 222 of the element 220 project downwardly over upper side portions of the wheels 102, thereby causing the upper portion of the wheels 102 to be substantially enclosed by the undersurface and sides 222 of the element 220, so that tape is guided onto the wheels 102 from the tape withdrawing and advancing means.

Operation

Assume that the apparatus has been assembled in the manner described above. The roll of tape 44 is installed in the rearward end of the dispensing body by inserting the vanes 48 of the hub 46 into the spool 50 upon which the tape is rolled. As seen in FIG. 3, the roll of tape 44 is placed between the side plates 20, 22 so that the loose end of tape is directed forwardly from the top of the roll. The mounting pin 52 is inserted through a first of the side plates (through the left side plate 20 as seen in FIG. 4), through the hub 46 and through the second side plate until the locking pin 54 encounters the outside of the first side plate. According to an operator's preference for positioning the hook portion 58, the mounting pin 52 may be inserted from either side plate 20, 22. The hook portion 58 of the mounting pin 52 is turned until the locking pin 54 enters the opening of the adjacent locking clip 56. A sharp turn of the hook portion 58 (in a clockwise direction as viewed in FIG. 3) causes the locking 54 to be fully received into the locking clip 56, thereby preventing the mounting pin from coming out of the hub 46 and locking the roll of tape 44 in the dispensing body.

As best seen in FIG. 3, the loose end of the tape is passed forwardly under the wheels 80 of the second feed roller 66 and upwardly to the contact point 120 between such wheels and the wheels 68 of the first feed roller 64. The wheels 102 or the wheels 68 are rotated in a counter-clockwise direction (shown by the arrow A) to cause the loose end of the tape to be upwardly entrained between the wheels 80 and 68 (the wheels 80 thereby being caused to rotate clockwise as shown by arrow B).

As the loose end of the tape is advanced upwardly between the wheels 80 and 68 by continued counter-clockwise rotation of the wheels 68 or 102, it contacts the undersurface of the arcuate portion 132 of the first guide element 124 and is directed upwardly and forwardly around the upper rearward portion of the wheels 68. Over the top of the wheels 68, the loose end of tape is passed forwardly above the second guide element 138 and the underside of the top plate 28, the rearwardly projecting fingers 140 of the second guide element preventing the loose end of the tape from continuing further forwardly and downwardly around the wheels 68. Continued counter-clockwise rotation of the wheels 68 or 102 advances the loose end of tape forwardly until it contacts the upper rearward portion of the wheels 102 where it is lifted upwardly by rotation of the wheels 102 to project forwardly, loosely and freely over the top of the wheels 102 to a position where it may be passed around the forward portion thereof. The sides 222 of the guide element 220 constrain the tape to pass over the top of the wheels 102.

As rotation of the wheels 102 or 68 is continued, the loose end of the tape tends to curl by itself around the forward and lower portions of the wheel 102 because the tape, being quite stiff, retains a substantial amount of the curvature it received while rolled on the roll 44, thus there is little need to manually wrap the end of the tape around the wheels 102.

The apparatus is now in readiness for applying the loose end portion of the tape to a tape receiving surface, for example a strip of previously applied joint compound as identified by the reference number 230 in FIG. 1. Such strip of compound 230 is shown applied over a crack or joint 232 between abutting sheets of wall board 234, 236.

An operator, holding the apparatus by the handle 152, positions the loose end of the tape over the near end region of the strip of compound 230 and positions the apparatus so that the pressure wheels 102 press the loose end of the tape into the strip of compound. Initially, the apparatus may be drawn along the strip of compound 230 toward the operator (downwardly as viewed in FIG. 1) until the extreme end of the tape is embedded into the compound (the wheels 102 and 68 thereby being caused to turn clockwise as seen in FIG. 3).

With the end of the tape firmly embedded in the compound, the operator, holding the apparatus at an angle of about 30° to 45° to the surface to which the tape is being applied, then moves the apparatus forwardly along the strip of compound 230 (upwardly as seen in FIG. 1) with the pressure wheels firmly pressing against the portion of tape 238. The teeth on the wheels 102 provide good traction against the surface of the tape and assure that the wheels 102 rotate as the tape is applied.

Because the wheels 102 are directly connected, via the gear 116, to the wheels 68, the counter-clockwise rotation of the wheels 102 as the tape is applied causes the wheels 68 to rotate, thereby causing withdrawing of tape from the roll of tape 44 and advancing of such withdrawn tape to the wheels 102 by the wheels 68 and 80. At no time do the wheels 102 themselves pull tape from the roll of tape 44 and withdrawing and advancing of tape from the roll is independent of tension in portions of the tape being applied. Such direct drive tape withdrawing and advancing isolates the portion of tape 238 already applied from the forces required to pull other portions of the tape from the roll 44. There is thus substantially no force acting to pull the portion of tape 238 along the direction of travel of the apparatus such as might cause dislodgment of the applied tape.

When the end of the strip of compound 230 is approached, the operator depresses the cutter actuator 210 by pressing on the flange 212 with his thumb, thereby causing the cutter blade 178 to move downwardy in the blade guideway against the resistance of the spring 196 and to cut the tape. The cutting is very rapid and easy because of the direct cutting action of the cutter and the shearing action against the edge 216, thereby minimizing any tendency to tear the tape as it is being advanced. When pressure on the actuator 210 is released, the spring 196 causes the blade 178 to return to its initial position.

As the remaining portion of a length of tape is applied to the tape receiving surface, a new end of a next section of tape is advanced to a position over the wheels 102 where it may be applied to a next tape receiving surface. Since the new ends of tape are always advanced loosely and freely over the top of the pressure wheels 102, there is no tendency for the ends to become entangled in the mechanism as, for example, might occur if the ends were required to be entrained between a pair of tensioned rollers. The operator is not required to manually route the tape after the initial end has been entrained by the wheels 68 and 80, advancement of each new end to the pressure wheels 102 being completely automatic and being performed while the remaining end of the previous strip is being applied. Operation of the apparatus, after initial loading, is thus performed with a single hand.

The handle 152 is positioned so that the operator's hand exerts a pressing force on the tape being applied generally through the axis of the third shaft 104, thereby minimizing the applying force required and minimizing operator fatigue.

The apparatus of the described embodiment is comparatively small, being thereby capable of applying tape in confined spaces. By way of example and not of limitation, the length of the side plates 20, 22 is about 11½ inches, the width (or height) is 2 inches and spacing between the side plates is 2¼ inches, assuming a standard dry-wall tape thickness of 2-1/16 inches. The side plates are constructed of ⅛ inch thick aluminum for strength and lightness. The wheels 102 and 68 are 2⅝ inches in diameter and ¼ inch wide, being constructed of a strong, durable plastic such as nylon. The outer surfaces of the wheels 102 are spaced 1¾ inches apart. The wheels 80 are 1¼ inch in diameter and ¼ inch wide, being also constructed of strong plastic. The gear 116 is ¾ inch in diameter, is ⅜ inch wide and is made of a metal such as brass.

Although the pressure roller 100 and the first and second feed rollers 64 and 66 are shown and described as each comprising sets of three spaced, narrow wheels, other numbers of wheels may be used. For example, a single wheel or roller may be used, and although use of toothed wheels 102 and 68 allows use of an interconnect gear 116 and provides for traction, single or multiple smooth wheels or sets of wheels having some smooth wheels may be used, auxiliary gears being used to intermesh with the gear 116.

The foregoing description is to be clearly understood as being given by way of illustration only, the spirit and scope of the invention being limited solely by the appended claims.

I claim:

1. A portable tape dispenser, which comprises, a dispensing body comprising a pair of laterally spaced elongate sides fixedly connected to each other, a tape supply spool rotatably mounted to said body at one end thereof, pressure wheels rotatably mounted to said body at the other end thereof, first and second mutually spaced feed wheel shafts mounted to said body, first feed wheels and second feed wheels mounted upon respective ones of said first and second shafts for rotation between said pressure wheels and tape supply spool, at least one of said pressure wheels and one of said first feed wheels having mutually spaced toothed peripheries, means for urging said first feed wheels and second feed wheels toward each other, tape guide means mounted on said body for providing a tape guide path from said feed wheels toward said pressure wheels, means for driving one of said first feed wheels and second feed wheels in response to rotation of said pressure wheels, a roll of tape mounted on said supply spool and including a tape portion extending under said second feed wheels, over said first feed wheels, through said guide means and freely and loosely over and beyond said pressure wheels, a cutter support fixed to said body and upstanding therefrom between said first feed wheels and said pressure wheels, said tape guide means including a guide plate positioned below said tape and having an edge substantially aligned with one side of said cutter support, blade guide means fixed to said cutter support, a cutter blade slidably mounted in said guide means for motion toward and away from said guide plate edge, a handle fixed to said cutter support, means for urging said cutter blade away from said guide plate edge, and means connected with said cutter blade and generally in line therewith adapted to be engaged by the thumb of a hand that grasps said handle for pressing said blade toward said guide plate edge to shear a tape section extending therebetween.

2. The dispenser of claim 1 wherein said handle extends substantially parallel and adjacent to said side plates and rearwardly toward but short of said supply spool, whereby said handle is positioned between said supply spool and said pressure wheels.

3. A dispenser of drywall tape comprising first and second laterally spaced elongated side plates a transverse top plate fixedly attached to corresponding edges of said side plates, a tape spool journalled for rotation on an axis positioned at one end of said side plates and extending therebetween, a first shaft extending transversely of and between said side plates at a forward end thereof, first and second mutually spaced pressure wheels journalled upon said first shaft between said side plates and each having a periphery extending beyond an edge of said side plates, a forward guide element bridging said side plates above said pressure wheels and secured to said side plates, a second shaft extending to and between said side plates and positioned at a forward position of said side plates rearwardly of said first shaft, first and second mutually spaced feed wheels journalled upon said second shaft, a third shaft extending between said side plates adjacent to and spaced rearwardly of said feed wheels, third and fourth feed wheels journalled upon said third shaft in close proximity to said first and second feed wheels, means for urging said first and second feed wheels and said third and fourth feed wheels toward each other, means for rotating said feed wheels in response to rotation of said pressure wheels, a cutter and handle support fixed to said side plates, said cutter and handle support spanning said plates and upstanding therefrom, said cutter and handle support including laterally spaced and inwardly facing guide channels extending upwardly from said side plates between said first and second shafts, a cutting blade mounted in said guide channels for reciprocating motion adjacent a forward portion of said transverse top plate, a thumb operated actuator having a rearwardly projecting flange fixed to an upper end of said cutting blade, and a handle fixed to said upstanding cutter and handle support below said thumb operator and extending rearwardly toward said tape spool, said handle terminating short of said tape spool whereby the handle is positioned substantially between said spool and said pressure wheels so that pressure applied normally by the hand of an operator upon said handle will apply a force directed substantially through said first shaft when said dispenser is operated to press said pressure wheels against a wall to which tape is to be applied and said side plates are positioned at an acute angle with respect to such wall.

4. The dispenser of claim 3 including a second guide element fixed to and spanning said side plates forwardly of said first feed wheels, said second guide element including rearwardly projecting fingers extending between said first feed wheels at adjacent upper edges thereof.

5. The dispenser of claim 3 including a roll of tape mounted upon said spool with the tape being withdrawn from an upper side thereof, the tape withdrawn from said roll being entrained below said third and fourth feed wheels, over and above said first and second feed wheels, and over and above said pressure wheels, whereby the natural curl of the tape withdrawn from said roll will tend to cause the free end of the tape to follow the curvature of said pressure wheels and to curl by itself around portions of the pressure wheels.

* * * * *